United States Patent [19]

Conaway et al.

[11] Patent Number: 5,525,163

[45] Date of Patent: Jun. 11, 1996

[54] WELDING COMPOSITIONS

[75] Inventors: Harold R. Conaway, Thousand Oaks; Bruce F. Olsen, Santa Monica; Robert E. Fish, Pinon Hills, all of Calif.

[73] Assignee: Rockwell International Corporation, Seal Beach, Calif.

[21] Appl. No.: 271,551

[22] Filed: Jul. 7, 1994

Related U.S. Application Data

[63] Continuation-in-part of Ser. No. 147,764, Nov. 5, 1993, abandoned, which is a continuation-in-part of Ser. No. 917, Jan. 6, 1993, abandoned, which is a continuation of Ser. No. 879,255, May 11, 1992, abandoned, which is a continuation of Ser. No. 830,517, Feb. 3, 1992, abandoned, which is a continuation of Ser. No. 790,848, Nov. 12, 1991, abandoned.

[51] Int. Cl.$^6$ .................................................. B23K 35/34
[52] U.S. Cl. ............................................ 148/23; 148/26
[58] Field of Search ........................................ 148/26, 23

[56] References Cited

U.S. PATENT DOCUMENTS

| | | | |
|---|---|---|---|
| 3,031,346 | 4/1962 | Wasserman | 148/26 |
| 3,192,076 | 6/1965 | Ballass | 148/26 |
| 3,372,057 | 3/1968 | Seifahrt | 148/26 |
| 3,372,066 | 3/1968 | Quaas | 148/26 |
| 3,636,301 | 1/1972 | Ischenko | 148/26 |
| 3,704,149 | 11/1972 | DeLong | 148/26 |
| 3,704,744 | 12/1972 | Halley | 148/26 |
| 3,754,897 | 8/1973 | Derham | 148/26 |
| 3,826,695 | 7/1974 | Leicher | 148/26 |
| 3,857,698 | 12/1974 | Gilpin | 148/26 |
| 3,865,578 | 2/1975 | Takashima | 148/26 |
| 4,338,142 | 7/1982 | Okuda | 148/26 |
| 4,436,562 | 3/1984 | Tokuhisa | 148/26 |
| 4,541,876 | 9/1985 | Hwang | 148/23 |

*Primary Examiner*—Peter D. Rosenberg
*Attorney, Agent, or Firm*—George A. Montanye; Harry B. Field; Steven E. Kahm

[57] ABSTRACT

Penetration Enhancing Compounds for use in welding is characterized as comprising select alkali metals and alkali earth metals and halogens.

12 Claims, 1 Drawing Sheet

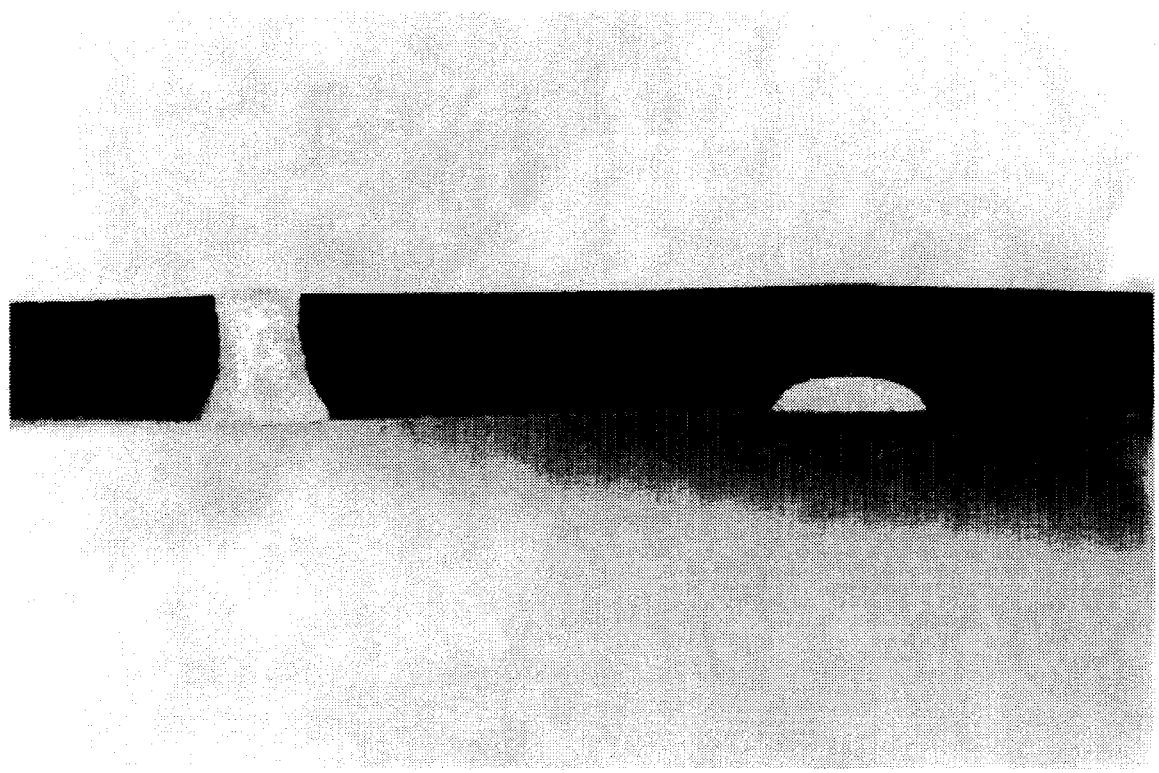

WELDING COMPOSITIONS

CROSS REFERENCES TO RELATED APPLICATIONS

This is a continuation-in-part of application Ser. No. 08/147,764 filed on Nov. 5, 1993 now abandoned, which is a Continuation-in-Part of application Ser. No. 08/000,917 filed Jan. 6, 1993, and abandoned as of the filing date hereof, and which was a continuation of abandoned application Ser. No. 07/879,255 filed May 11, 1992, which was a continuation of abandoned application Ser. No. 07/830,517 filed Feb. 3, 1992, which was a continuation of abandoned parent application Ser. No. 07/790,848 filed Nov. 12, 1991.

BACKGROUND OF THE INVENTION

1. Field of the Invention

This invention relates to welding technologies and more specifically to a composition for enhancing weld quality.

2. Description of Prior Art

Gas tungsten arc welding (GTAW) is a fusion welding process wherein metallic components are caused to locally coalesce when heated by electrical energy transferred from a nonconsumable tungsten electrode to the work pieces. The heated area is shielded from the oxidizing effects of air by an envelope of inert gas—argon, helium, or mixtures thereof. The process is performed manually or by machine. The resulting welds are of exceptionally high quality in a wide variety of metals which are sensitive to the deleterious effects of welding in an oxidizing environment.

By virtue of inherent arc energy transfer characteristics, simple fusion by conventional gas tungsten arc welding is practically limited to joining thicknesses on the order of 0.12 inch (4.7 mm) or less. Above this thickness, joint preparation, usually a machined groove configuration, is required wherein material is locally removed to reduce the thickness to a practical thickness prerequisite to achieving full fusion penetration of the weld joint. The removed material is replaced by filler material, usually in wire form, added in one or more applications—passes—to restore the material to the desired thickness.

The consequences of such miltipass welds are high total energy input, multiple weld passes long welding time, additional costs associated with joint preparation and filler material, a need for high manipulative skills and/or complex equipment, significant heat-induced effects such as shrinkage and distortion, the increased possibility of the occurrence of interpass defects or undesirable structures, and the increased frequency of repair work to mitigate these conditions.

Inherent in a majority of welding processes is the utilization of an added welding composition which may function to effect metal refinement, atmospheric protection, stabilization of the arc phenomena, as well as weld bead constituency.

Such compositions are generally based on silica, silicates, limestone, clays and many other minerals. Heretofore, little attention has been given to the purity of the components making up these compositions. Often the chemical constitution varies widely, depending upon the source of the chemicals utilized. Even residual constituents will influence the physical and chemical behavior thereof.

As is known, the weight percent of basic components to acidic components influences welding activity in many ways. For example, a basic composition is known to have a gettering effect on sulfur and phosphorus, while an acidic composition enhances slag control during the welding procedure.

Weld enhancers of various types have been known and used throughout many years. Specifically, flux compositions are for brazing, soldering, and some welding processes, excluding GTAW. They are applied to the metal surfaces to be joined and are designed to prevent, dissolve, or facilitate removal of oxides and other undesirable surface substances during welding. Notwithstanding the use of fluxes, welds have a propensity to be inconsistent, nonhomogeneous, and fraught with voids fissures.

Fluxes are mixtures of a variety of compounds including rosin, borax, calcium oxide, silicon dioxide, among many others and are generally varied depending on the type of metal to be joined and the particular joining process to be used. Notwithstanding these great variations, the one flux characteristic that remains constant is that for the flux to perform its function, it must be thoroughly and evenly applied to the entire surface area to be joined. These added flux compositions are not useable with GTAW in that they interfere with the arc action, contaminate the tungsten electrode, and extinguish the welding arc.

SUMMARY OF THE INVENTION

Accordingly, there is provided by the present invention a composition adjunct to gas tungsten arc welding and methods of preparing and applying same. The compositions contain surface active elements including lighter alkali metals, alkali earth metals, and certain halogens that enhance the depth of weld penetration permitting single pass welds to be made in inordinately thick sections using abnormally low welding energy. The use of the compositions minimize weld joint preparation, welding time, the use of filler material, and results in weldments with substantially less warpage and distortion. The resulting welds are of equivalent quality and mechanical properties to conventional gas tungsten arc welds made not using the composition. These penetration-enhancing compounds are not a flux and do not function as a cleaning agent to reduce surface oxides. Rather, they modify the welding arc resulting in much deeper, more narrow welds.

Welding formulations of the present invention are to a certain extent dependent on the chemical composition and physical properties of the metal alloy to be welded. For instance, a welding composition that would work well with an iron base or nickel base alloy could be less suitable for use with aluminum, magnesium or titanium alloys. Also of importance is the amount of surface active elements present in trace amounts. Knowing these conditions, a specific formula is compounded, and adjustments made to result in optimum weld penetration.

In its broadest form there is taught and disclosed a welding composition comprising a mixture of from about 7 to about 59 weight percent LiF and one or more other compounds selected from Table 1 in a carrier fluid. Further, there is taught herein a process for enhancing weld penetration comprising the steps of applying a penetration enhancing composition to the area to be welded and wherein said penetration enhancing composition comprises from about 7 to about 59 weight percent LiF and one or more other compounds selected from Table 1; and running the welding torch along the area where the penetration enhancing compound had been applied.

OBJECTS OF THE INVENTION

Accordingly, it is an object of the present invention to provide a welding composition which enhances arc stability. (This was true for 321SS—context would be hard to justify without more data.)

Another object of the invention is to provide a welding composition such that the slag is easy to manipulate during welding.

Yet a further object of the invention is to provide penetration enhancing compositions which produce a superior weld joint.

Still a further objective on the present invention is to improve the GTAW process through application of a unique welding composition which enhances weld penetration hence eliminating or reducing the disadvantages associated with multipass welding.

Other objects, advantages and novel features of the present invention will become apparent from the following detailed description of the invention when considered in conjunction with the accompanying drawing.

BRIEF DESCRIPTION OF THE FIGURE

FIG. 1 is a reproduction of a photomicrograph comparing GTAW with and without PEC.

DESCRIPTION OF THE PREFERRED EMBODIMENTS

Penetration Enhancing Compounds (PECs) are mixtures of chemical compounds containing surface active elements which, when applied preferably as a thin surface coating, substantially increases depth of penetration and increases depth-to-width ratio at abnormally low energy input compared to conventional gas tungsten arc welds made without PECs. To date, three hundred fifty-six (356) discrete tests, 1,632 inches of weld and 2,550 grams (≈5 pounds) of PECs in 98 batches and 66 different compositions have dramatically shown the tremendous technological enhancements resulting from the application of these novel composition to materials undergoing gas tungsten arc welding.

Table 1 depicts the 72 PEC batches and the 66 distinct PEC compositions which have been tested. In reviewing the test results, certain specific characteristics were checked. These characteristics included dry mix capability, adhesion/cohesion, arc stability, reduced fume, weld bead modifiers, and ultimately the weld depth-to-width ratio. Judging against these qualities, batch 69 (SS12-1) was determined to provide the best overall qualities. Tests suggested that the tested composition would work not only on iron-based alloys, such as 321 CRES, but on nickel-base alloys, such as alloy 718, and potentially other

TABLE 1

Penetration Enhancing Compounds

| Compound | (1) | (2) | (3) G2-5 | (4) G4-2 | (5) G2-15 | (6) G2-16 | (7) G-4 | (8) G4-1 | (9) G2-10 | (10) G2-11 | (11) G2-12 | (12) G2-13 | (13) G2-14 | (14) G3 | (15) G2 | (16) G2-8 |
|---|---|---|---|---|---|---|---|---|---|---|---|---|---|---|---|---|
| Al$_2$O$_3$ | | | 20.0 | 31.25 | 17.77 | 17.44 | 28.25 | 29.94 | 42.37 | 17.05 | 16.85 | 17.77 | 17.77 | | 17.65 | 33.33 |
| CaCl$_2$ | | | | 6.25 | 5.7 | 2.32 | 5.65 | 5.99 | | 2.27 | 2.25 | 2.27 | 2.27 | | 2.35 | |
| MgCl$_2$ | | | 5.33 | 6.25 | 4.55 | 5.8 | 8.5 | 8.98 | 6.78 | 4.54 | 4.50 | 4.54 | 4.54 | 11.76 | 4.70 | 15.05 |
| LiF | 25.0 | 7.6 | 40.0 | 37.5 | 34.1 | 34.88 | 33.9 | 35.9 | 50.85 | 34.09 | 33.71 | 34.09 | 34.09 | 58.82 | 35.9 | 40.0 |
| CrF$_3$ | | | 21.3 | 18.75 | 9.1 | 9.3 | 18.08 | 19.16 | | 9.09 | 8.99 | 9.09 | 9.09 | 29.4 | 9.41 | 21.33 |
| TiO$_2$ | | | 13.33 | | 11.36 | 11.63 | | | | 11.36 | 11.24 | 11.36 | 11.36 | | 11.76 | |
| KCl | | | | | 2.27 | 2.32 | | | | 2.27 | 2.25 | 2.27 | 5.68 | | 2.35 | |
| SiO$_2$ | | | | | 2.27 | 2.32 | | | | 2.27 | 6.74 | 2.27 | 2.27 | | 2.35 | |
| Na$_2$SO$_4$ | | | | | 2.27 | 2.32 | 5.65 | | | 5.68 | 2.25 | 2.27 | 2.27 | | 2.35 | |
| CaO | 25.0 | 30.8 | | | | | | | | | | | | | | |
| CrCl$_3$ | | | | | | | | | | | | | | | | |
| CaF$_2$ | | | | | | | | | | | | | | | | |
| MgF$_2$ | 25.0 | 30.8 | | | | | | | | | | | | | | |
| NiF$_2$ | | | | | 9.1 | 9.3 | | | | 9.09 | 8.99 | 9.09 | 9.09 | | 9.4 | |
| AlF$_3$ | | | | | | | | | | | | | | | | |
| MgO | | | | | | | | | | | | | | | | |
| B$_2$O$_3$ | | | | | | | | | | | | | | | | |
| FeCl$_3$ | 25.0 | 30.8 | | | 2.27 | 2.32 | | | | 2.27 | 2.25 | 5.68 | 2.27 | | 2.35 | |
| Fe$_2$O$_3$ | | | | | | | | | | | | | | | | |
| NiF$_3$ | | | | | | | | | | | | | | | | |

| Compound | (17) G2-9 | (18) G2-6 | (19) G2-3 | (20) G2-4 | (21) G2-1 | (22) G2-2 | (23) G1 | (24) R5 | (25) R4 | (26) R2 | (27) R1 | (28) | (29) | (30) FB-1 | (31) FB-2 | (32) SS-1 | (33) SS-2 | (34) SS-3 | (35) SS-4 |
|---|---|---|---|---|---|---|---|---|---|---|---|---|---|---|---|---|---|---|---|
| Al$_2$O$_3$ | | 21.13 | 19.0 | 19.48 | 18.07 | 18.52 | 17.05 | 10.96 | 17.86 | 20.0 | 21.7 | 22.47 | 10.05 | 22.2 | 25.0 | 33.3 | 33.3 | 33.3 | 33.3 |
| CaCl$_2$ | | | 2.53 | 2.6 | 2.41 | 2.47 | 4.55 | 5.38 | 7.14 | 8.0 | 8.7 | 6.17 | 2.23 | 5.5 | 6.3 | 5.6 | 5.6 | 5.6 | 5.6 |
| MgCl$_2$ | 15.05 | | 5.06 | 5.19 | 4.82 | 4.94 | 9.09 | 14.34 | 7.14 | 8.0 | 8.7 | 9.7 | 10.73 | 11.1 | 6.3 | 5.6 | 5.6 | 5.6 | 5.6 |
| LiF | 40.0 | 42.25 | 37.98 | 38.96 | 36.14 | 37.04 | 28.41 | 21.51 | 25.0 | 16.0 | 8.7 | 19.53 | 25.47 | 22.2 | 25.0 | 33.3 | 33.3 | 33.3 | 33.3 |
| CrF$_3$ | 21.33 | 11.27 | 10.13 | 10.39 | 9.64 | 9.88 | 9.09 | 8.03 | 7.14 | 8.0 | 8.7 | 7.05 | 4.8 | 11.1 | 25.0 | 22.2 | 22.2 | 22.2 | 22.2 |
| TiO$_2$ | 33.33 | 14.08 | 12.66 | 13.0 | 12.05 | 12.35 | 11.36 | 9.68 | 10.71 | 12.0 | 13.0 | 12.56 | 11.17 | 5.5 | | | | | |
| KCl | | | 2.53 | | 2.41 | 2.47 | 2.27 | 3.73 | 3.57 | 4.0 | 4.3 | 3.08 | 2.23 | 11.1 | | | | | |
| SiO$_2$ | | | | | 2.41 | | 2.27 | 8.24 | 7.14 | 8.0 | 8.7 | 8.6 | 6.48 | 5.5 | | | | | |
| Na$_2$SO$_4$ | | | | | | | 2.27 | 6.05 | 3.57 | 4.0 | 4.3 | 2.6 | 6.03 | 5.5 | | | | | |
| CaO | | | | | | | | | | | | | | | 12.5 | | | | |
| CrCl$_3$ | | | | | | | | | | | | | | | | | | | |
| CaF$_2$ | | | | | | | | | | | | | | | | | | | |
| MgF$_2$ | | | | | | | | | | | | | | | | | | | |

TABLE 1-continued

| | Penetration Enhancing Compounds | | | | | | | | | | | |
|---|---|---|---|---|---|---|---|---|---|---|---|---|
| NiF$_2$ | 11.27 | 10.13 | 10.39 | 9.64 | 9.88 | 9.09 | 6.35 | 7.14 | 8.0 | 8.7 | 8.15 | 4.47 |
| AlF$_3$ | | | | | | | | | | | | 12.96 |
| MgO | | | | | | | | | | | | |
| B$_2$O$_3$ | | | | | | | | | | | | |
| FeCl$_3$ | | | | 2.41 | 2.47 | 4.55 | 5.70 | 3.57 | 4.0 | 4.3 | 2.20 | 3.35 |
| Fe$_2$O$_3$ | | | | | | | | | | | | |
| NiF$_3$ | | | | | | | | | | | | |

| | Batch No. | | | | | | | | | | | | | | | |
|---|---|---|---|---|---|---|---|---|---|---|---|---|---|---|---|---|
| Compound | (36) SS-5 | (37) SS-6 | (38) SS-7 | (39) G5-1 | (40) G6-1 | (41) G7-1 | (42) SS-8 | (43) SS-9 | (44) SS-10 | (45) SS-11 | (46) G8-1 | (47) G9-1 | (48) G10-1 | (49) G11-1 | (50) G11-2 | (51) G11-3 |
| Al$_2$O$_3$ | 33.3 | 33.3 | 33.3 | 31.2 | 31.2 | 28.5 | 20.0 | 32.4 | 27.8 | 27.8 | | | | | | |
| CaCl$_2$ | 5.6 | 5.6 | 5.6 | | 6.3 | 5.7 | 6.7 | 5.4 | 5.5 | 5.5 | 6.2 | 10.0 | 7.4 | 7.1 | 8.3 | 10.0 |
| MgCl$_2$ | 5.6 | 5.6 | 5.6 | | 6.3 | 5.7 | 6.7 | 5.4 | 5.5 | 5.5 | 6.2 | 5.0 | 4.8 | 7.1 | 8.3 | 10.0 |
| LiF | 33.3 | 33.3 | 33.3 | 37.5 | 37.5 | 40.0 | 33.3 | 37.8 | 38.8 | 38.8 | 37.5 | 30.0 | 29.6 | 28.6 | 33.3 | 40.0 |
| CrF$_3$ | 22.2 | 22.2 | 22.2 | 18.7 | | 20.0 | 13.3 | 18.9 | 22.2 | 22.2 | 18.7 | | 7.4 | 14.3 | 16.6 | 20.0 |
| TiO$_2$ | | | | | | | 6.7 | | | | | | | | | |
| KCl | | | | | | | | | | | | | | | | |
| SiO$_2$ | | | | | | | | | | | | | | | | |
| Na$_2$SO$_4$ | | | | | | | | | | | | | | | | |
| CaO | | | | | | | | | | | | | 11.1 | 14.3 | 16.6 | 20.0 |
| CrCl$_3$ | | | | | 18.7 | | | | | | | 15.0 | 7.4 | | | |
| CaF$_2$ | | | | 6.3 | | | | | | | | | | | | |
| MgF$_2$ | | | | 6.3 | | | | | | | | | | | | |
| NiF$_2$ | | | | | | | 13.3 | | | | | | | | | |
| AlF$_3$ | | | | | | | | | | | 31.3 | 40.0 | 32.2 | 28.6 | 16.6 | |
| MgO | | | | | | | | | | | | | | | | |
| B$_2$O$_3$ | | | | | | | | | | | | | | | | |
| FeCl$_3$ | | | | | | | | | | | | | | | | |
| Fe$_2$O$_3$ | | | | | | | | | | | | | | | | |
| NiF$_3$ | | | | | | | | | | | | | | | | |

| | Batch No. | | | | | | | | | | | | | |
|---|---|---|---|---|---|---|---|---|---|---|---|---|---|---|
| Compound | (52) G11-4 | (53) G11-5 | (54) G11-6 | (55) G11-7 | (56) G11-8 | (57) G11-9 | (58) G11-10 | (59) G11-11 | (60) G11-12 | (61) G11-13 | (62) G11-14 | (63) G12-1 | (64) G12-2 | (65) G12-3 |
| Al$_2$O$_3$ | | | | | | | | | | | | 16.7 | 23.1 | 21.4 |
| CaCl$_2$ | 6.3 | | | | | | | | | | | | | |
| MgCl$_2$ | 6.3 | 7.7 | | | | | | | | | | | | |
| LiF | 25.0 | 30.7 | 33.3 | 36.4 | 40.0 | 44.4 | 36.4 | 33.3 | 38.5 | 30.8 | 33.3 | 38.5 | 38.5 | 42.8 |
| CrF$_3$ | 12.5 | 15.4 | 16.7 | 18.2 | 20.0 | 11.1 | 27.3 | 33.3 | 15.4 | 15.4 | 16.7 | 15.4 | 15.4 | 14.3 |
| TiO$_2$ | | | | | | | | | | | | | | |
| KCl | | | | | | | | | | | | | | |
| SiO$_2$ | | | | | | | | | | | | | | |
| Na$_2$SO$_4$ | | | | | | | | | | | | | | |
| CaO | 12.5 | 15.4 | 16.7 | 9.1 | | | | | 15.4 | 23.1 | | | | |
| CrCl$_3$ | | | | | | | | | | | | | | |
| CaF$_2$ | | | | | | | | | | | | | | |
| MgF$_2$ | | | | | | | | | | | | | | |
| NiF$_2$ | | | | | | | | | | | | | | |
| AlF$_3$ | 37.5 | 30.7 | 33.3 | 36.4 | 40.0 | 44.4 | 36.4 | 33.3 | 30.8 | 30.8 | 33.3 | | | |
| MgO | | | | | | | | | | | | 23.1 | 46.2 | 21.4 |
| B$_2$O$_3$ | | | | | | | | | | | | | | |
| FeCl$_3$ | | | | | | | | | | | | | | |
| Fe$_2$O$_3$ | | | | | | | | | | | | | | |
| NiF$_3$ | | | | | | | | | | | | | | |

| | Batch No. | | | | | | |
|---|---|---|---|---|---|---|---|
| Compound | (66) G12-4 | (67) G12-5 | (68) G12-6 | (69) SS12-1 | (70) SS13-1 | (71) SS12-2 | (72) SS12-3 |
| Al$_2$O$_3$ | 25.0 | 23.6 | 23.6 | 23.6 | 23.6 | 25.6 | 21.9 |
| CaCl$_2$ | | | | | | | |
| MgCl$_2$ | | | | | | | |
| LiF | 41.6 | 39.4 | 39.4 | 39.4 | 39.4 | 42.7 | 36.5 |
| CrF$_3$ | 16.7 | 15.7 | 15.7 | | | | |
| TiO$_2$ | | | | | | | |
| KCl | | | | | | | |
| SiO$_2$ | | | | | | | |
| Na$_2$SO$_4$ | | | | | | | |
| CaO | | | | | | | |

TABLE 1-continued

Penetration Enhancing Compounds

| | | | | | | | |
|---|---|---|---|---|---|---|---|
| $CrCl_3$ | | | | | | | |
| $CaF_2$ | | | | | | | |
| $MgF_2$ | | | | | | | |
| $NiF_2$ | | | | | | | |
| $AlF_3$ | | | | | | | |
| MgO | 16.7 | 15.7 | 15.7 | 15.7 | 15.7 | 17.1 | 14.5 |
| $B_2O_3$ | | 5.5 | 5.5 | 5.5 | 5.5 | | |
| $FeCl_3$ | | | | | | | |
| $Fe_2O_3$ | | | | 15.7 | 7.8 | 8.5 | 21.9 |
| $NiF_3$ | | | | | 7.8 | 6.0 | 5.1 | materials such as carbon steels, aluminum alloys, copper-based alloys, cobalt-based alloys, and titanium-based alloys.

The preferred penetrating enhancing compound comprises:

| Materials | Range | Preferred Range | Preferred Approximate Composition |
|---|---|---|---|
| $Al_2O_3$ | 10–43 | 16–33 | 23 |
| LiF | 7–59 | 22–45 | 39 |
| MgO | 14–46 | 14–23 | 15 |
| $B_2O_3$ | 4–8 | 4.5–7.7 | 7 |
| $Fe_2O_3$ | 7–22 | 8–16 | 16 |

For this PEC, the preferred carrier was determined to be methanol; however, other alcohols such as isopropyl have also been used.

Once the PECs are prepared whether by dry mixing or otherwise, it is ready for application to the material to be welded. Although the most preferred method of application is by mixing it with a carrier fluid and air brushing it on, hand brushing the PECs onto the to-be-welded metal has also been successfully used. Other methods of application of PEC such as forming it into or onto a tape or by concurrently introducing it into the welding arc as the welding takes place are also within the scope of this invention.

Although welds were able to far exceed physical properties requirements, it was still desired to enhance weld bead crown surface appearance. To accomplish this objective, it was decided to explore welding in the pulsed arc mode—a parameter which had shown merit in prior testing with respect to forcing a more uniform surface. Testing had suggested that although wide variations would work, that the weld schedule should approximate 133a/67a—3.0 pps @50%—8.2 v—3.3 IPM for the alloys and thickness tested. Arc voltage and travel speed were held constant for the test series. High current and background current values were selected to result in a constant 100-ampere average; hence, an average energy input of 14.9 kilojoules per inch. The latter value was selected since it had consistently produced full penetration, single pass welds in prior tests.

At this point, it is appropriate to review the mathematical terms which have been used, and will be used, to elucidate the efficacy of PEC welding, compared to conventional GTA welding, with respect to energy input and weld geometry.

Energy Input ($E_i$) is, for the purposes of this invention, measured in kilojoules per inch (Kj/in) according to the expression:

$$E_i = A \times V \times 60 \div (1000 \times IPM)$$

where:
A=indicated arc current in amperes
V=indicated arc voltage in volts
IPM: indicated travel speed in inches per minute
The numerical values are conversion constants It should be noted that A and V represent the total arc circuit from power supply output to power supply ground, hence only crudely indicate wattage across the arc.

A lower energy input value to achieve equivalent depth of fusion is a comparative indicator of greater process efficiency.

Arc Efficiency is, for the purposes of this invention, a convenience value which represents the volume of a solidified fusion zone in one linear inch of weld per kilojoule of energy for a given set of welding parameters as expressed by:

$$AE = A_w$$

where:
AE=arc efficiency in cubic inches per kilojoule ($X \cdot XX^{10-3}$ in³/Kj)
$A_w$=measured cross-section area of the fusion zone in square inches (in²)
$E_i$=indicated energy input in kilojoules per inch (Kj/in)

A higher value of AE is an indicator of great arc efficiency.

Depth-to-Width Ratio (D/W) is a generally accepted measurement of process efficiency. The value is unitless.

A higher value is an indicator of greater process efficiency.

For full penetration welds, D/W is obtained by measuring the visible widths of the weld bead crown and root and averaging the results. This value is then divided into the original thickness of the weld joint.

For partial penetration welds, a transverse section of the weld is required. D/W is obtained by dividing the measured width of the crown by the depth of fusion measured from the original top surface at the weld joint.

This method works well for joints of the same thickness but becomes somewhat more complicated for dissimilar thickness joints.

FIG. 1 shows a transverse section cut from one test weld. The section also contains a non-PEC weld made using the same parameters. Both weld geometries are consistent with the range of results of prior tests. As noted earlier, $E_i$=14.9 Kj/in for both welds. D/W=1.79 and 0.22, and AE=2.18 for the PEC weld and 1.03 for the non-PEC weld.

The crown surface of the PEC weld was quite uniform and displayed excellent physical properties, but still showed some roughness (i.e., not as cosmetically "pretty" as a good conventional GTA weld).

STAINLESS STEEL SERIES—Prior work involving Corrosion-Resistant Steel (CRES) alloys was revisited at the onset of developing a PEC specifically "tailored" for stainless steel. By reasons of availability and usage, 0.275 inch thick×3.0 inches wide×6.0 inches long Type 321CRES plates were selected for testing.

In the initial PEC mix, $CrF_3$ was replaced with ferric oxide ($Fe_2O_3$). The selection was based on availability, low cost, toxicity, no water of hydration, presumed similarity of reaction in the arc environment, and the predominance of iron (Fe) in the CRES composition.

For mechanical properties evaluation, test plates were restrained and machine tack welded. The PEC was then spray applied to the face side of the stripe 0.010±0.003 inch thick×0.75 inch wide centered over the weld joint.

The final selected weld schedule was 155a/78a (116.5a average)—4.0 pps @50%—8.5 v—3.3 IPM. Total $E_i$ (for 18.0 inches of weld) was 324 Kj. Each weld was completed in 5.5 minutes arc time.

For comparison purposes, equivalent conventional GTAW test panels were welded. A typical J-groove (U-groove for the abutted plates) was machined on the long edge of each plate. The plates were clamped in a fixture identical to that used for the PEC welds.

The conventional GTAW joint was completed in five passes, including a back (root-side) pass, as required to affect panel flatness. Welding parameters varied per pass in conformance with normal interpass conditions. The interpass crown surfaces were "skim" cut with a rotary carbide burr to remove oxides, dross, and segregation.

$E_i$ for the completed weld was ≈63 Kj/in—totalling≈1130 Kj for 18.0 inches. Final D/W was ≈0.9. AE was ≈1.58. Each weld consumed ≈0.3 lb of filler wire (≈$18.00). Arc-time per weld was ≈25 minutes.

ARC VOLTAGE CONTROL (AVC) SERIES—The excellent arc/weld pool placidity observed when welding with PEC #SS12-1 prompted a brief excursion to determine if Automatic Voltage Control (AVC) could now be used. The AVC mechanism has been explained in the references.

Bead-on-plate test weld runs were made on 0.268 inch thick Type 321 CRES. The PEC was spray applied as a stripe 0.010±0.001 inch thick×0.75 inch wide. Welding parameters were continuous arc 150a—10 v—3.5 IPM. $E_i$ was 25.7 Kj/in. D/W was 1.4. AE was 1.75. AVC attenuation was set at maximum thus minimizing response to voltage fluctuations.

Performance was excellent—very stable with virtually no fume. It was observed that arc length at the start [on bare metal] was ≈0.06 inch. As the arc entered the PEC burden, arc length decreased to ≈0.03 inch which was normal when using a locked head (AVC disengaged).

Equivalent results were obtained with welding in the pulsed arc mode—specifically: 200–100a—4 pps @50%—10.0 v—3.5 IPM.

From these results, it was concluded that AVC could be utilized, previously a matter of concern with respect to the versatility of PEC welding.

THIN MATERIAL SERIES—since material thicknesses 0.125 inch and greater had been welded, it was deemed advisable to characterize PEC welding of thinner material.

Sample panels of Alloy 718, 3.0 inches wide×10.0 inches long were acquired in sheet thicknesses of 0.062 and 0.078 inch. PEC #SS12-1 was spray applied 0.004±0.001 inch thick×0.62 inch wide.

A Dimetrics 75 ampere power supply/programmer, Model 293 D, was adapted to the original weld carriage, as was a smaller torch—Weldcraft WD-9P. Also, a smaller electrode was used—0.625 inch diameter, Tungsten-2% Thoria, with a 30° included angle tip.

For the 0.062 inch thickness, continuous arc parameters were applied: 25a—11.5 v—4.0 IPM. $E_i$ was 4.3 Kj/in. AE was 1.44. The weld crown was 0.10 inch wide—flush to slightly convex. The root was the same width—slightly convex. D/W was 0.78.

For the 0.078 inch thickness, pulsed arc parameters were applied: 40a/20a (27A Avg.)—15 pps @35%—11.0 v—4.0 IPM. $E_i$ was 4.7 Kj/in. AE was 2.08. The weld crown was 0.13 inch wide—slightly convex. The weld root was 0.11 inch wide—slightly convex. D/W was 0.65.

Arc/weld pool stability was excellent. Fume was so negligible there was no need for the fume extractor. Weld surfaces were smooth and uniform.

By way of example and not limitation, the following is provided:

EXAMPLE I

A welding composition of the invention was prepared by mixing one part each by volume of $FeCl_3$, CaO, $MgF_2$, and LiF in an amount of isopropyl alcohol sufficient to render a creamy, paint-like paste.

The welding composition of this example, when utilized in a welding procedure, resulted in a full penetration weld in 0.250-inch-thick nickel base alloy. The weld bead was 0.201 inch wide at the top and 0.234 inch wide at the root. Welding parameters were 150 amps, 9 volts, and 4 inches per minute travel speed. A comparable weld made without the welding composition was 0.390 inch wide at the top and 0.110 inch deep which was typical for conventional welding conditions.

EXAMPLE II

A welding composition of the invention was prepared by mixing in isopropyl alcohol, 4 parts $FeCl_3$, 4 parts CaO, 4 parts $MgF_2$, and 1 part LiF.

The welding flux composition of Example II resulted in a full penetration weld in 0.125 inch thick nickel alloy. The weld bead was 0.138 inch wide at the top and 0.087 inch wide at the root. Welding parameters were 45 amps, 9 volts, and 3 inches per minute travel speed. A comparable weld made without the compound was 0.165 inch wide at the top and 0.040 inch deep.

EXAMPLE III

A welding composition of the invention was prepared by mixing isopropyl alcohol with 20 wt. % aluminum oxide, 13.3 wt. % titanium dioxide, 5.3 wt. % magnesium chloride, 40 wt. % lithium fluoride, and 21.3 wt. % chromic fluoride. The test results obtained were similar to those obtained in Example I.

EXAMPLE IV

A welding composition of the invention was prepared by mixing isopropyl alcohol with 31 wt. % aluminum oxide, 6 wt. % calcium chloride, 6 wt. % magnesium chloride, 38 wt. % lithium fluoride, and 19 wt. % chromic fluoride.

The welding composition of this example, when utilized in a welding procedure, resulted in a full penetration weld in 0.250 inch thick nickel base alloy. The weld bead was 0.150 inch wide at the top and 0.190 inch wide at the bottom or root. Welding parameters were 140 amps, 8.6 volts, and 4 inches per minute travel speed.

While the invention has been described with reference to a preferred embodiment, it will be understood by those skilled in the art that variations thereto can be made without departing from the spirit and scope of the invention.

What is claimed:

1. A welding composition comprising a mixture of from about 7 to about 59 weight percent LiF and one or more other compounds selected from Table 1 in a carrier fluid.

2. A welding composition of claim 1 comprising a mixture of from about 10 to about 43 wt. % $Al_2O_3$, from about 7 to about 59 wt. % LiF from about 14 to about 46 wt. % MgO, from about 4 to about 8 wt. % $B_2O_3$, and from about 7 to about 22 wt. % $Fe_2O_3$ in a carrier fluid.

3. The welding composition of claim 2 comprising a mixture of from about 16 to about 33 wt. % $Al_2O_3$, from about 22 to about 45 wt. % LiF from about 14 to about 23 wt. % MgO, from about 4.5 to about 7.7 wt. % $B_2O_3$, and from about 8 to about 16 wt. % $Fe_2O_3$ in a carrier fluid.

4. The welding composition of claim 3 comprising a mixture of about 23 wt. % $Al_2O_3$, about 39 wt. % LiF, about 15 wt. % MgO, about 7 wt. % $B_2O_3$, and about 16 wt. % $Fe_2O_3$ in a carrier fluid.

5. The welding composition of claim 2 further comprising a carrier fluid.

6. The welding composition of claim 4 wherein said carrier fluid is alcohol.

7. The welding composition of claim 6 wherein said alcohol is selected from the group of methanol and isopropyl alcohol.

8. A welding composition of claim 1 comprising a mixture of one part each by volume of $FeCl_3$, CaO, $MgF_2$, and LiF in isopropyl alcohol.

9. A welding composition of claim 1 comprising a mixture of four parts $FeCl_3$, 4 parts CaO, 4 parts $MgF_2$, and 1 part LiF in isopropyl alcohol.

10. A welding composition of claim 1 comprising, the mixture ratio in wt. %, of 20.0 aluminum oxide, 13.3 titanium dioxide, 5.3 magnesium chloride, 40.0 lithium fluoride, and 21.3 chromic fluoride in isopropyl alcohol.

11. A welding composition of claim 1 comprising, the mixture ratio in wt. %, of 31 aluminum oxide, 6 calcium chloride, 6 magnesium chloride, 38 lithium fluoride, and 19 chromic fluoride in isopropyl alcohol.

12. A process for enhancing weld penetration comprising the steps of:

applying a penetration enhancing composition to the area to be welded and wherein said penetration enhancing composition comprises from about 7 to about 59 weight percent LiF and one or more other compounds selected from Table 1;

and running the welding torch along the area where the penetration enhancing compound had been applied.

* * * * *